(12) United States Patent
Nathan et al.

(10) Patent No.: US 8,489,561 B1
(45) Date of Patent: Jul. 16, 2013

(54) LEARNING ENTERPRISE PORTAL CONTENT META-MODEL

(75) Inventors: Eyal Nathan, Tel Aviv (IL); Nimrod Barak, Tel Aviv (IL)

(73) Assignee: SAP Portals Israel Ltd, Ra'anana (IL)

( * ) Notice: Subject to any disclaimer, the term of this patent is extended or adjusted under 35 U.S.C. 154(b) by 0 days.

(21) Appl. No.: 13/438,098

(22) Filed: Apr. 3, 2012

(51) Int. Cl.
*G06F 17/30* (2006.01)

(52) U.S. Cl.
USPC .......................................................... 707/691

(58) Field of Classification Search
USPC .................. 707/2, 3, 691; 709/223; 717/100, 717/105
See application file for complete search history.

(56) References Cited

U.S. PATENT DOCUMENTS

| | | | |
|---|---|---|---|
| 7,668,112 B2 | 2/2010 | Helfman et al. | |
| 7,984,417 B2 | 7/2011 | Ben-Zvi et al. | |
| 2004/0205691 A1* | 10/2004 | Poole et al. | 717/100 |
| 2009/0007062 A1* | 1/2009 | Gilboa | 717/105 |
| 2011/0283270 A1* | 11/2011 | Gass et al. | 717/168 |

* cited by examiner

*Primary Examiner* — Etienne Leroux
(74) *Attorney, Agent, or Firm* — Fish & Richardson P.C.

(57) ABSTRACT

The disclosure generally describes computer-implemented methods, software, and systems for updating enterprise portal content meta-models. One computer-implemented method includes receiving a content analysis request associated with a content repository, analyzing, using at least one computer, the content repository content objects for inconsistencies with a meta-model, receiving meta-model modification suggestion data, modifying the meta-model using the meta-model modification suggestion data, and receiving modification status data.

24 Claims, 5 Drawing Sheets

Content Model Synchronization Results

Show: All

| Model Modification | Generated Model ID | Status |
|---|---|---|
| Add new object type: Page | com.xyzportals.portal.page | ✓ OK |
| Create containment relation: Page > iView | relation.contains.page_iview | ✓ OK |
| Create containment relation: Role > Page | relation.contains.role_page | ✓ OK |
| Create property: com.xyz.portal.iview.isHTML5Compliant | N/A | ✓ OK |

LEARNING ENTERPRISE PORTAL CONTENT META-MODEL

TECHNICAL FIELD

The present disclosure relates to computer-implemented methods, software, and systems for updating enterprise portal content meta-models.

BACKGROUND

Many enterprise portal system content administration tools are based upon use of content meta-models. Enterprise portal system administrators use modeling tools to describe and implement enterprise portal content entities, for example business objects and business-object relationships. When using the administrative modeling tools, modeling concept and tool complexity and uncoordinated/inconsistent additions, changes, and/or deletions of and to enterprise portal content entities often result in difficult administration of the enterprise portal system content. An inability to effectively administer enterprise portal content entities often leads to a high total cost of ownership for the enterprise portal system.

SUMMARY

The disclosure generally describes computer-implemented methods, software, and systems for updating enterprise portal content meta-models. One computer-implemented method describes receiving a request to analyze content in a content repository against a meta-model for inconsistencies with the meta-model. If inconsistencies are found, receiving data suggesting modification(s) to the meta-model to correct the inconsistencies, modifying the meta-model using the received data, and receiving meta-model modification status data.

The present disclosure relates to computer-implemented methods, software, and systems for updating enterprise portal content meta-models. One computer-implemented method includes receiving a content analysis request associated with a content repository, analyzing, using at least one computer, the content repository content objects for inconsistencies with a meta-model, receiving meta-model modification suggestion data, modifying the meta-model using the meta-model modification suggestion data, and receiving modification status data.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with the general implementation, the analysis of the content repository is performed by a content analyzer.

In a second aspect, combinable with any of the previous aspects, the meta-model modification suggestion data comprises model modification objects.

In a third aspect, combinable with any of the previous aspects, a particular model modification object of the model modification objects represents at least one suggested modification to the meta-model to rectify an identified inconsistency between the content object and the meta-model.

In a fourth aspect, combinable with any of the previous aspects, determining that a meta-model modification is to be performed.

In a fifth aspect, combinable with any of the previous aspects, the determination is made based upon input received by a graphical user interface, wherein meta-model modification selections are selected.

In a sixth aspect, combinable with any of the previous aspects, the modification of the meta-model is performed by a meta-model synchronization service.

In a seventh aspect, combinable with any of the previous aspects, modifying a portal content directory consistent with the modifications made to the meta-model.

The subject matter described in this specification can be implemented in particular implementations so as to realize one or more of the following advantages. First, inconsistencies between content repository objects and meta-models can be more easily identified and rectified. The analysis process is automated and an administrator makes a final decision as to which discovered inconsistencies to correct, if any. Second, enterprise portal content may be efficiently analyzed on a regular basis and the content and underlying meta-model to be kept in a more consistent state. Third, total cost of ownership to administer enterprise portal content is reduced. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The disclosure generally describes computer-implemented methods, software, and systems for updating enterprise portal content meta-models. For the purposes of this disclosure, an enterprise resource portal (ERP), also known as an enterprise information portal (EIP) or a corporate portal, is a framework for integrating information, people, and processes across organizational boundaries. An ERP provides a secure unified access point, often in the form of a web-based user interface, and is designed to aggregate and personalize information through application-specific portals. The ERP is a de-centralized content contribution and content management system, which keeps the information always updated. With only a web browser, enterprise portal users can begin work once they have been authenticated in the ERP which offers a single point of access to information, enterprise applications, and services both inside and outside an organization. ERPs may present information from diverse sources in a unified and structured way, and provide additional services, such as dashboards, an internal search engine, e-mail, news, navigation tools, and various other features. ERPs are often used by enterprises for providing their employees, customers, and possibly additional users with a consistent look and feel, and access control and procedures for multiple applications, which otherwise would have been separate entities altogether.

Generally, through a graphical user interface (GUI), an enterprise portal user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the enterprise portal user. These and other UI elements may be related to or represent the functions of the web browser.

Figure 1:
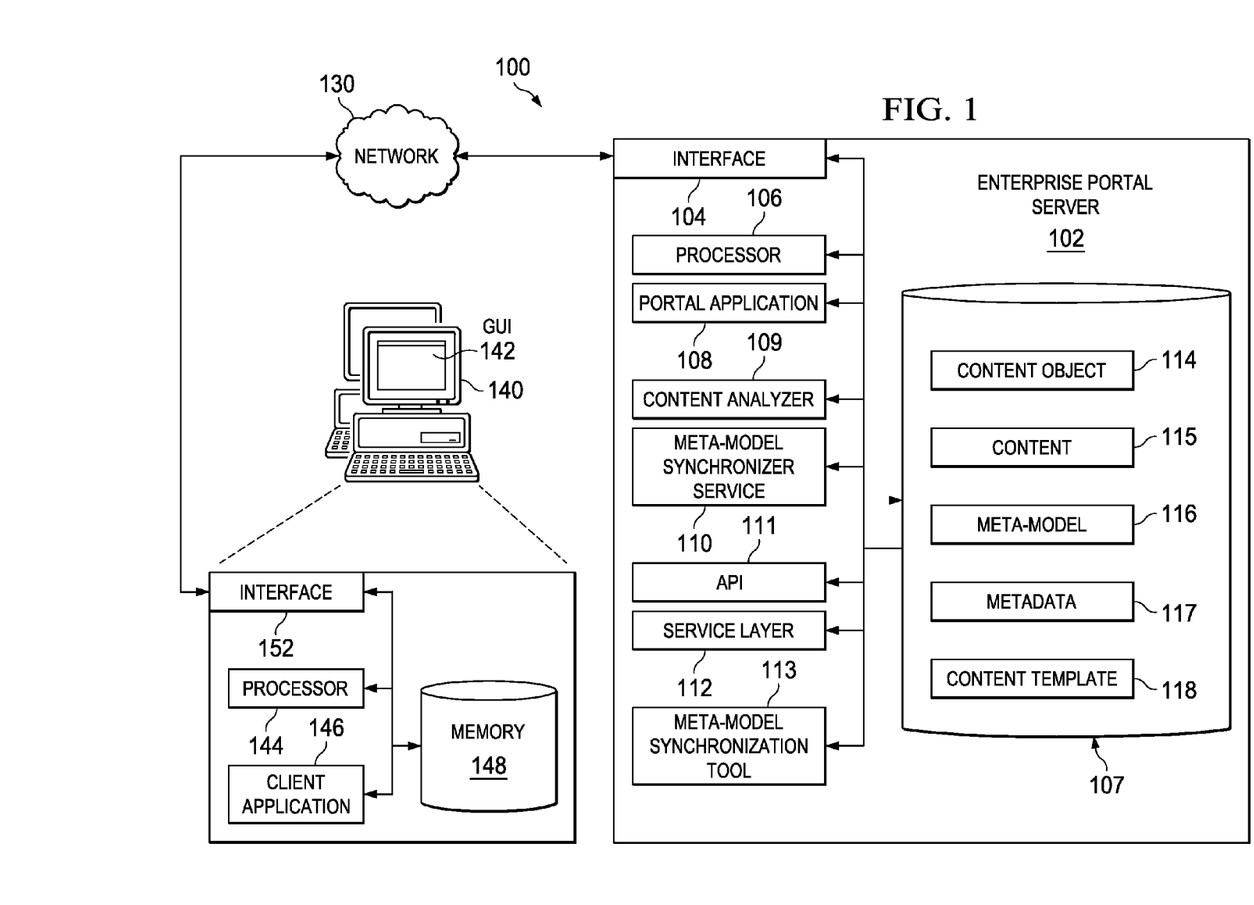
FIG. 1 is a block diagram illustrating an example system for updating enterprise portal content meta-models.

FIG. 1 illustrates an example distributed computing system 100 operable to update enterprise portal content meta-models. In some implementations, updating enterprise portal content meta-models can be automatic. Specifically, the illustrated example distributed computing system 100 includes or is communicably coupled with an enterprise portal server 102 and a client 140 that communicate across a network 130.

In general, the enterprise portal server 102 is a server that stores one or more portal applications 108, where at least a portion of the portal applications 108 are executed via requests and responses sent to users or clients within and communicably coupled to the illustrated example distributed computing system 100. In some implementations, the enterprise portal server 102 may store a plurality of various portal applications 108. In other implementations, the enterprise portal server 102 may be a dedicated server meant to store and execute only a single portal application 108. In some implementations, the enterprise portal server 102 may comprise a web server, where the portal applications 108 represent one or more web-based applications accessed and executed by the client 140 via the network 130 or directly at the enterprise portal server 102 to perform the programmed tasks or operations of the portal application 108.

At a high level, the enterprise portal server 102 comprises an electronic computing device operable to receive, transmit, process, store, or manage data and information associated with the example distributed computing system 100. Specifically, the enterprise portal server 102 illustrated in FIG. 1 is responsible for receiving application requests, for example enterprise portal navigation requests, from one or more client applications associated with the client 140 of the example distributed computing system 100 and responding to the received requests by processing said requests in the associated portal application 108, and sending the appropriate response from the portal application 108 back to the requesting client application 146. In addition to requests from the client 140, requests associated with the portal applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single enterprise portal server 102, environment 100 can be implemented using two or more servers 102, as well as computers other than servers, including a server pool. Indeed, enterprise portal server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated enterprise portal server 102 may be adapted to execute any operating system, including Linux, UNIX, Windows, Mac OS, Java, Android, iOS or any other suitable operating system. According to one implementation, enterprise portal server 102 may also include or be communicably coupled with an e-mail server, a web server, a caching server, a streaming data server, and/or other suitable server.

The enterprise portal server 102 also includes an interface 104, a processor 106, and a memory 107. The interface 104 is used by the enterprise portal server 102 for communicating with other systems in a distributed environment—including within the environment 100—connected to the network 130; for example, the client 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the enterprise portal server 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the enterprise portal server 102. Specifically, the processor 106 executes the functionality required to receive and respond to requests from the client 140 and/or perform analysis and synchronization of enterprise portal content meta-models.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Objective C, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The enterprise portal server 102 also includes a memory 107, or multiple memories 107. The memory 107 may include any type of memory or database module and may take the form of volatile and/or non-volatile memory including, without limitation, magnetic media, optical media, random access memory (RAM), read-only memory (ROM), removable media, or any other suitable local or remote memory component. The memory 107 may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto associated with the purposes of the enterprise portal server 102. Additionally, the memory 107 may include any other appropriate data, such as VPN applications, firmware logs and policies, firewall policies, a security or access log, print or other reporting files, as well as others. While memory 107 is illustrated as in integral component of the enterprise portal server 102, in alternative implementations memory 107 can be external to the enterprise portal server 102 and/or the example distributed computing system 100.

The enterprise portal server 102 further includes an application programming interface (API) 111. The API 111 may include specifications for routines, data structures, and object classes. The API 111 may be either computer language independent or dependent and refer to a complete interface, a single function, or even a set of APIs. In some implementations, the API 111 can be used to interface between the portal application 108, a content analyzer 109, a meta-model synchronizer service 110, a portal navigation service 112, a meta-model synchronization tool 113, and/or other system components, both hardware and software. For example, in one implementation, the portal application 108 can utilize API 111 to communicate with the content analyzer 109.

The backend service layer 112 provides software services to the example distributed computing system 100. The functionality of the ERP may be accessible for all service consumers via this service layer. Software services, such as meta-model synchronizer service 110 (described below), provide reusable, defined business functionalities through a defined interface. For example, the interface may be software written in extensible markup language (XML) or other suitable language. While illustrated as an integrated component of the enterprise portal server 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module or enterprise application (not illustrated) or of another hardware module (not illustrated) without departing from the scope of this disclosure.

The memory 107, i.e., the content repository for the ERP that holds the description and/or data for all objects in the ERP, includes a content object 114, content 115, a meta-model 116, metadata 117, and a content template 118. Although illustrated as single instances, there may be more than one instance of the content object 114, content 115, meta-model 116, metadata 117, and content template 118.

The content object 114 can be considered a representation of a business/non-business entity, such as an employee, a sales order, an invoice, a financial report, etc. The content object 114 may encompass both functions, for example in the form of methods, and data, such as one or more properties. For example, content objects 114 may reduce system complexity by reducing a system into smaller units. The implementation details of content objects 114 are typically hidden from a non-development user and may be accessed through the defined functions and encapsulated data. Content objects 114 also form a point of entry of the functions and data of a system and enable the system to easily share, communicate, display, or otherwise operate with other systems. A content object 114 may also be considered the target of a request for data, for example a navigation node in an ERP, a web page, or the final destination of a navigation action, etc. and may contain the view to be displayed when the content object 114 is accessed. In some implementations, the content object 114 can control the location of a selected view, personalized views for a specific enterprise portal user, and dynamic views. Metadata 117 may be used to determine the context of a particular displayed view.

The content 115 is encountered as part of the user experience when accessing a content object 114 within an enterprise portal. The content 115 may include, among other things: text, images, sounds, videos, and animations. While illustrated as integrated with memory 107 of the enterprise portal server 102 in the example distributed computing system 100 of FIG. 1, in alternative implementations the content 115 can be external to the enterprise portal server 102 and/or the example distributed computing system 100 or can be internal to the content object 114.

Figure 2:
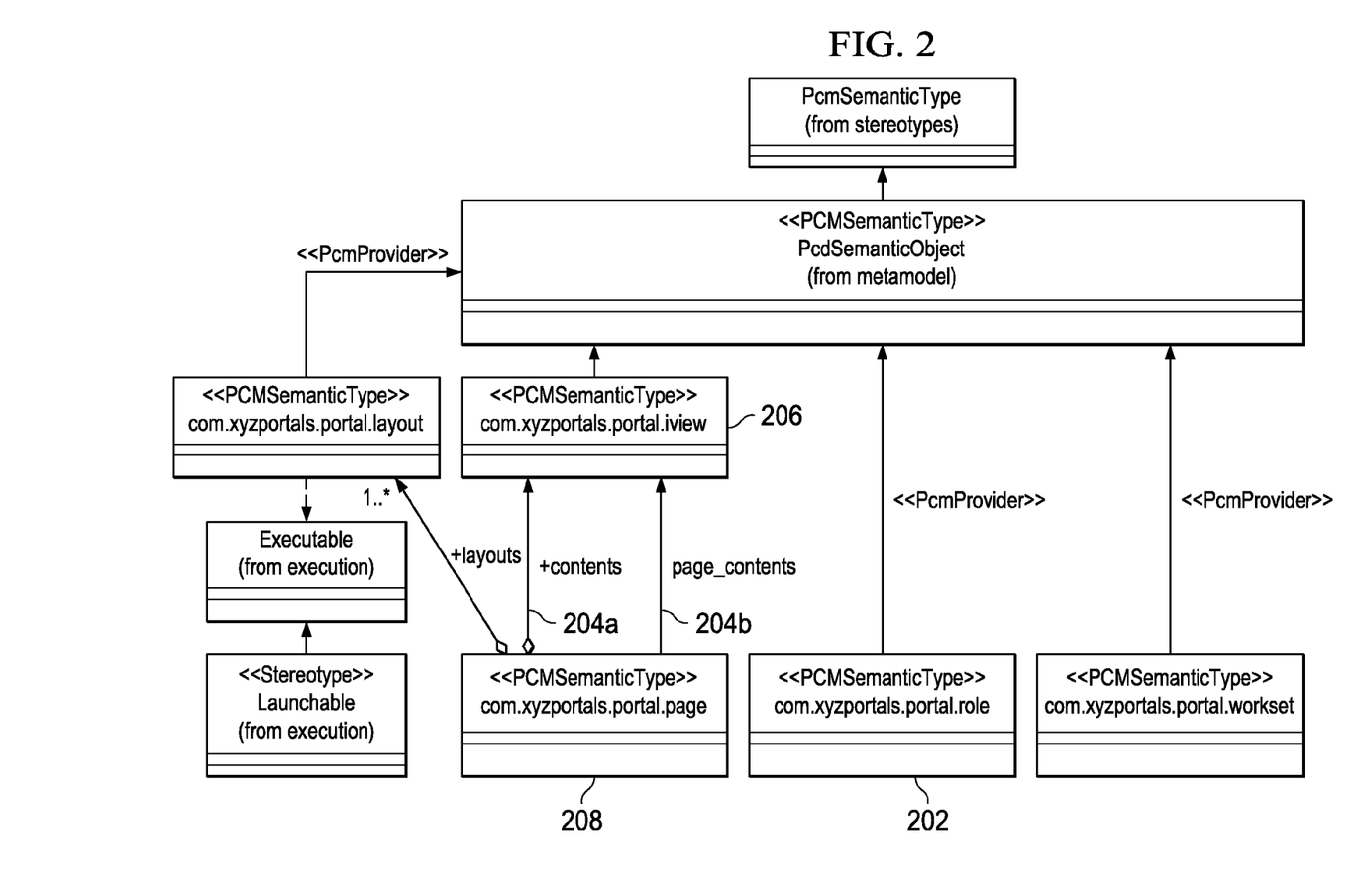
FIG. 2 illustrates an example enterprise portal content meta-model.
Figure 3:
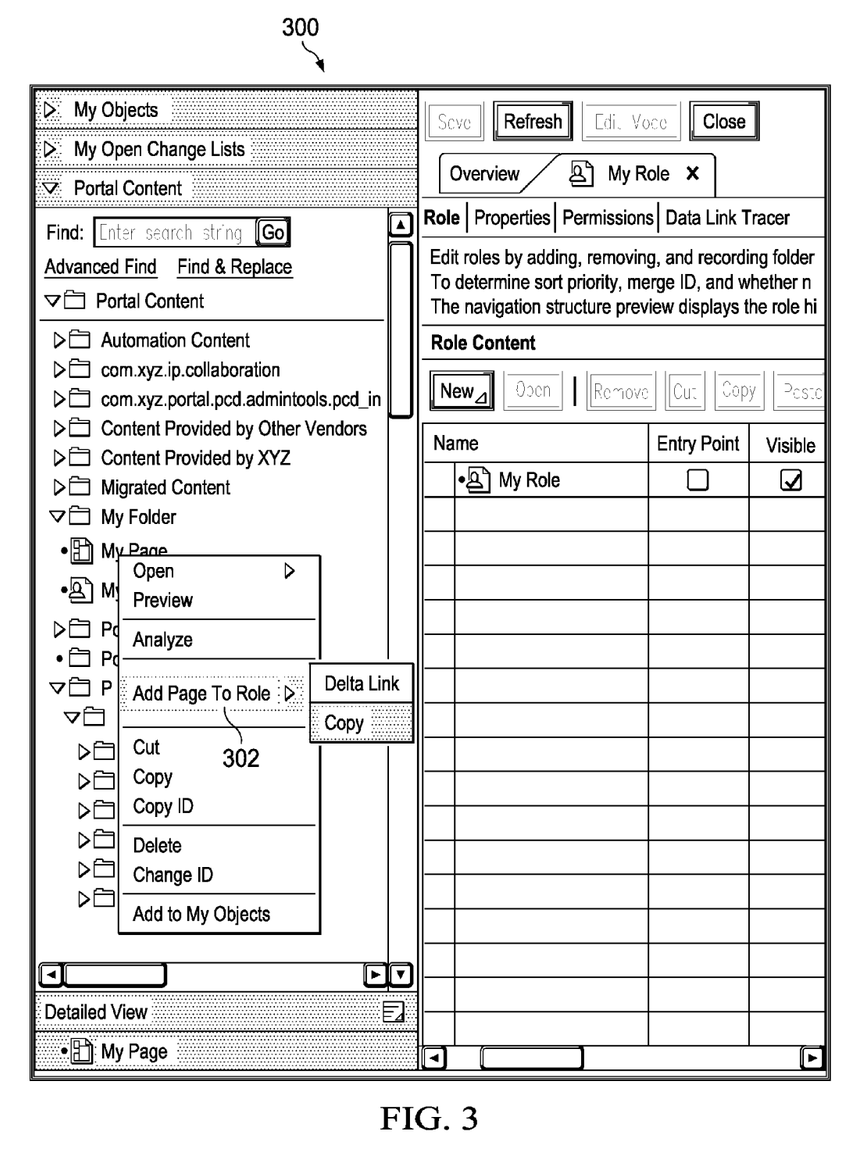
FIG. 3 illustrates an example administrative modeling tool interface.

The meta-model 116 is an enterprise portal content meta-model (EPCMM), a set of definitions that describe basic enterprise portal objects, for example content objects, and relations between the enterprise portal objects. The EPCMM defines at a high-level how content objects in an enterprise portal interact, and also properties of those content objects. Turning now to FIG. 2, FIG. 2 illustrates an example EPCMM 200. In some implementations, an EPCMM 200 can be described using a Unified Modeling Language (UML) diagram, but in other implementations, the EPCMM 200 can be described using any suitable representational scheme and/or method. For example, as illustrated in FIG. 2, an EPCMM definition of a semantic object com.xyzportals.portal.role ("Role") 202 is shown. The Role may have a set of properties defined by metadata 117, for example a "Title" property defining the title of a Role with a value of "HR Manager." Metadata 117 may also contain data applicable to other defined objects, software, hardware, etc. and be accessible by any component of the example distributed computing system 100. As illustrated, the EPCMM also defines relationships 204a and 204b between the com.xyzportals.portal.iview ("iView") semantic object 206 and the com.xyzportals.portal.page ("Page") semantic object 208. Turning now to FIG. 3, FIG. 3 illustrates an example administrative modeling tool interface 300. An example interface option for adding a relationship between a Role content object and a Page content object is shown at 302. If the underlying meta-model is not updated to reflect an added relationship between a Role and a Page (or other modifications such as added/deleted properties, changed property types and/or values, etc.), inconsistencies develop between the underlying meta-model 116 and content objects 114.

Returning to FIG. 2, using the EPCMM, an enterprise portal business model may be created using a set of definitions that extend the EPCMM meta-model definitions and describe the business model enterprise portal content objects that derive from the EPCMM meta-model to represent the actual company's structure, content, business process flow, etc. For example, an iView content object called "Product X" may be derived from the EPCMM iView semantic object 206 and include all the properties and relationships of the iView semantic object 206 and further extend them with specific properties or relationships relevant to a Product X specific iView content object. Further, the Product X specific iView content object may include a relation to one or more enterprise portal page content objects derived from the Page semantic object 208.

Returning to FIG. 1, while illustrated as integrated with memory 107 of the enterprise portal server in the example distributed computing system 100, in alternative implementations meta-model 116 can be external to the enterprise portal server 102 and/or the example distributed computing system 100. Likewise, while illustrated as integrated with memory 107 of the enterprise portal server in the example distributed computing system 100, in alternative implementations metadata 117 can be external to the enterprise portal server 102 and/or the example distributed computing system 100.

The content template 118 is a content object with pre-defined structure and properties that can be used as a template when creating new content objects. Content templates are identified by a dedicated property that can be set by an administrator, for example "com.xyz.portal.pcd.unit.IS_TEMPLATE." If the value of this property is set to "true" then the content object is considered to be a content template, meaning that administrators can create new content objects based on it. As a further example, an administrator can create a Page object, configure it to use two-column layout, and then mark it as a content template. When an administrator later attempts to create a new Page object, a template may be selected from existing content templates, including the created two-column Page template. If the administrator selects the two-column Page template, the newly created Page object will be configured to use a two-column layout without requiring any additional configuration tasks from the administrator.

The enterprise portal server 102 further includes a content analyzer 109. The content analyzer 109 can perform an analysis of the content repository 107 and identify inconsistencies between the content object 114 and metadata 117 defined for the meta-model 116 applicable to the content object 114. The inconsistency analysis may include any suitable matching and/or comparison method, algorithm, or technique.

Figure 4:
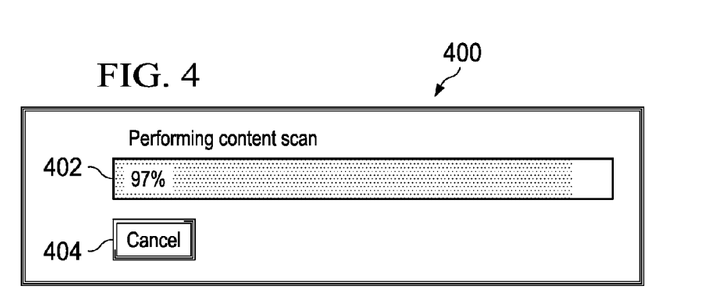
FIG. 4 illustrates an example content scan status interface.

A user may start a content analyzer 109 content analysis using a GUI or other suitable interface. In some implementations, the content analysis can triggered by a GUI application and/or iView. The GUI application and/or iView will be available to administrators through standard portal navigation, for example a link on the top of a page that will launch the meta-model synchronization tool 113 (described below). Turning now to FIG. 4, FIG. 4 illustrates an example content scan status interface 400 with a status indicator 402 and operations available to the user (e.g., Cancel) 404 that is presented to the user by the meta-model synchronization tool 113 during the content analyzer 109 analysis operation. In this example, the status indicator indicates the content scan is 97% complete. Other status interface types, information, and/or operations may be presented and/or available to the user without departing from the scope of this disclosure.

In some implementations, example of inconsistencies identifiable by the content analyzer 109 include:

New object type—a content object 114 of an unknown type is found in the content repository 107 but there is no metadata 117 available in the meta-model 116 for that content object 114 type.

Object property change—new properties are defined on existing content object 114 types and/or new values are set for existing properties.

Entity relationships—new relationships are defined between content objects 114. Example entity relationship types include:

Containment—parent-child relationships between content objects 114, according to their location in the hierarchical content repository 107. For example, if an object of type "Page" exists as a child of an object with type "Role," a new containment relation can be defined between the "Role" and "Page" content object types.

Property Based—for example, a content object 114 references another content object 114 by storing its Uniform Resource Identifier (URI) as a property. In this example, the relationship name is then derived from the referencing property name. For example, if an content object 114 of type "iView" has a property called "helpPage" the value of which is the URI of a content object 114 of type "Page," a new relationship called "helpPage" can be defined between the "iView" and "Page" content object 114 types.

Templates—a content template dedicated property is identified in the content repository 107 but no matching metadata 117 exists for it in the meta-model 116.

Other types of inconsistencies and entity relationship types may also be analyzed.

Figure 5:
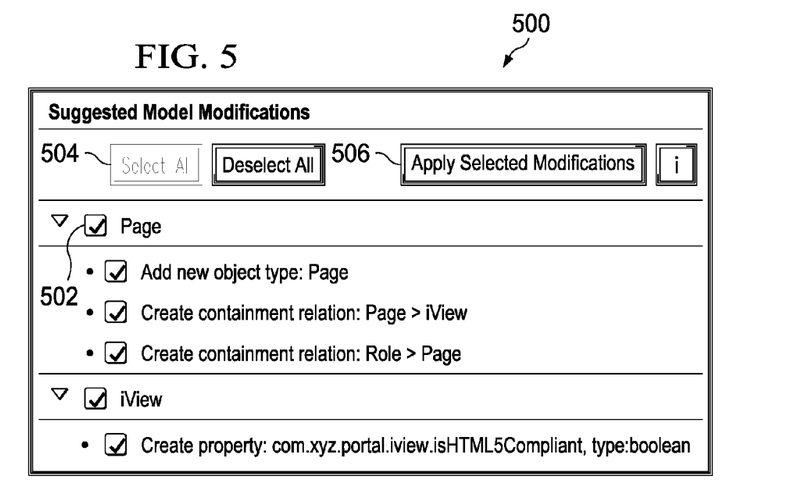
FIG. 5 illustrates an example suggested meta-model modifications interface.

In some implementations, the output of a content analyzer 109 analysis operation is a list of model modification objects, which represent the suggested modifications to the meta-model 116 to rectify identified inconsistencies between the content object 114 and the meta-model 116. In this way, the ERP is able to "learn" about inconsistencies between content repository content objects and the meta-model and suggestions can be made to a user to correct the inconsistencies. For example, identified inconsistencies may result in suggested meta-model 116 modifications including "Add new object type named: Page", "Create containment relation: Page>iView", "Create containment relation: Role>Page", and "Create property: com.xyz.portal.iview.is HTML5Compliant, type: Boolean". Turning now to FIG. 5, FIG. 5 illustrates an example suggested meta-model modifications interface 500 presented to the user by the meta-model synchronization tool 113 (described below) listing the example suggested meta-model 116 modifications and allowing the selection of suggested modifications to apply to the meta-model 116. As illustrated, the suggested meta-model modification interface 500 includes the identified suggested meta-model modifications 502, selection buttons 504, and an application button 506 to apply all or a subset of the suggested modifications to the meta-model 116. Other selection method types, information, and/or available operations may be presented and/or made available to the user without departing from the scope of this disclosure. In some implementations, the suggested modifications can be used as input for the meta-model synchronizer service 110 (described below), which applies suggested modifications to the runtime meta-model 116 representation.

In some implementations, the content analyzer 109 can provide an API (not illustrated) for performing the analysis of the content repository. In some implementations, the provided content analyzer 109 API can interface with API 111. In some implementations, API 111 can act as the API for the content analyzer 109. In some implementations, other internal/external services, software, and/or other components, including those not illustrated, can communicate with the content analyzer 109 directly and/or via the API 111.

The enterprise portal server 102 further includes a meta-model synchronizer service 110. The meta-model synchronizer service 110 is responsible for updating the run-time meta-model 116 representation in the example distributed computing system 100. In some implementations, the meta-model synchronizer service 110 receives a set of model modification objects which represent the suggested modifications to the meta-model 116 to rectify inconsistencies between the content object 114 and the meta-model 116 identified by the content analyzer 109. In some implementations, the meta-model synchronizer service 110 also updates the meta-model persistence in a Portal Content Directory (PCD). The PCD is a main repository for ERP content, both delivered with the portal and created by enterprise portal administrators. In some implementations, the PCD can contain a hierarchy of folders, each of which can contain semantic objects, such as iViews, Pages, and Roles. In some implementations, the PCD can be stored in an ERP database and accessed using a PCD Generic Layer (GL), a Java Naming and Directory Interface (JNDI) provider that implements additional functionality, including the following:

Personalization: The PCD enables portal objects to be personalized. For each attribute of each portal object, different values can be stored for each user. For example, an iView that displays the weather can have an attribute called City. Each enterprise portal user can set the City attribute for that iView to a different city, so the weather for that city is displayed for that enterprise portal user.

Delta Links: The PCD enables the creation of enterprise portal objects whose attributes are inherited from another enterprise portal object. Changes on the original object update the delta links Locking: The PCD enables the locking of objects to avoid concurrent modifications.

Once the suggested modifications are applied, the enterprise portal administration tools will reflect the state of the modified meta-model.

In some implementations, the meta-model synchronizer service 110 can communicate with the content analyzer 109 directly using the content analyzer 109 API and/or using the API 111. In some implementations, internal/external services, software, and/or other components, including those not illustrated, can communicate with the meta-model synchronizer service 110 directly and/or using the API 111.

Figure 6:
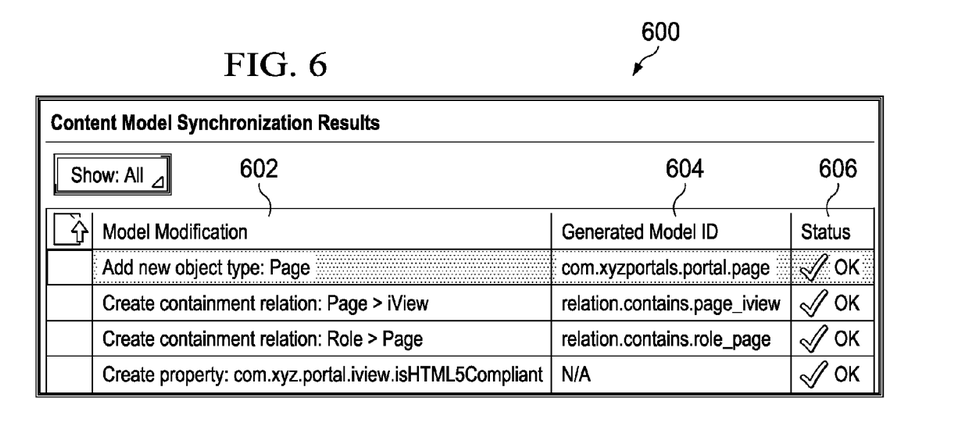
FIG. 6 illustrates an example content model synchronization results status interface.

The enterprise portal server 102 further includes a meta-model synchronization tool 113. In some implementations, the model synchronization tool 113 is an application providing GUI interfaces for: 1) initiation of a content analyzer 109 analysis operation; 2) presentation of a status interface of the initiated content analyzer 109 analysis operation (see FIG. 4); 3) presentation of an interface listing suggested meta-model 116 modifications and allowing an administrator or other suitable user to select/apply all or a subset of the suggested modifications to the meta-model 116 (see FIG. 5); and 4) generation and presentation of a synchronization status report interface following the application of the selected suggested modifications to the meta-model 116. Turning now to FIG. 6, FIG. 6 illustrates an example content model synchronization results status interface 600 presented to the user by the meta-model synchronization tool 113 following the application of the selected suggested modifications to the meta-model 116. As illustrated, the synchronization status report 600 includes the identified meta-model modification 602 performed, a generated meta-model ID 604, and the status 606 of the meta-model modification. Other presented information and/or available operations may be presented and/or made available to the user without departing from the scope of this disclosure. In some implementations, the meta-model synchronization tool 113 provides interfaces through a web browser. In some implementations, status information related to the update of the PCD consistent with the update to the meta-model is also displayed in the content model synchronization status report interface.

Returning to FIG. 1, the illustrated example distributed computing system 100 also includes the client 140, or multiple clients 140. The client 140 may be any computing device operable to connect to or communicate with at least the enterprise portal server 102 via the network 130 using a wireline or wireless connection. In general, the client 140 comprises an electronic computer device operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the server 102. Further, although illustrated as a single client application 146, the client application 146 may be implemented as multiple client applications in the client 140. In some implementations, the client application 146 may act as a GUI interface for the model synchronization tool 113.

The illustrated client 140 further includes an interface 152, a processor 144, and a memory 148. The interface 152 is used by the client 140 for communicating with other systems in a distributed environment—including within the example distributed computing system 100—connected to the network 130; for example, the enterprise portal server 102, as well as other systems communicably coupled to the network 130 (not illustrated). Generally, the interface 152 comprises logic encoded in software and/or hardware in a suitable combination and operable to communicate with the network 130. More specifically, the interface 152 may comprise software supporting one or more communication protocols associated with communications such that the network 130 or interface's hardware is operable to communicate physical signals within and outside of the example distributed computing system 100.

As illustrated in FIG. 1, the client 140 includes a processor 144. Although illustrated as a single processor 144 in FIG. 1, two or more processors may be used according to particular needs, desires, or particular implementations of the example distributed computing system 100. Each processor 144 may be a central processing unit (CPU), an application specific integrated circuit (ASIC), a field-programmable gate array (FPGA), or another suitable component. Generally, the processor 144 executes instructions and manipulates data to perform the operations of the client 140. Specifically, the processor 144 executes the functionality required to send requests to the enterprise portal server 102 and to receive and process responses from the enterprise portal server 102.

Further, the illustrated client 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise portal server 102.

The illustrated client 140 also includes a memory 148, or multiple memories 148. The memory 148 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 140. Additionally, the memory 148 may include any other appropriate data, such as VPN applications, firmware logs and policies, firewall policies, a security or access log, print or other reporting files, as well as others.

There may be any number of clients 140 associated with, or external to, the example distributed computing system 100. For example, while the illustrated example distributed computing system 100 includes one client 140, alternative implementations of the example distributed computing system 100 may include multiple clients 140 communicably coupled to the enterprise portal server 102 and/or the network 130, or any other number suitable to the purposes of the example distributed computing system 100. Additionally, there may also be one or more additional clients 140 external to the illustrated portion of the example distributed computing system 100 that are capable of interacting with the example distributed computing system 100 via the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the enterprise portal server 102 or the client 140 itself, including digital data, visual information, or a GUI 142, as shown with respect to the client 140.\

Figure 7:
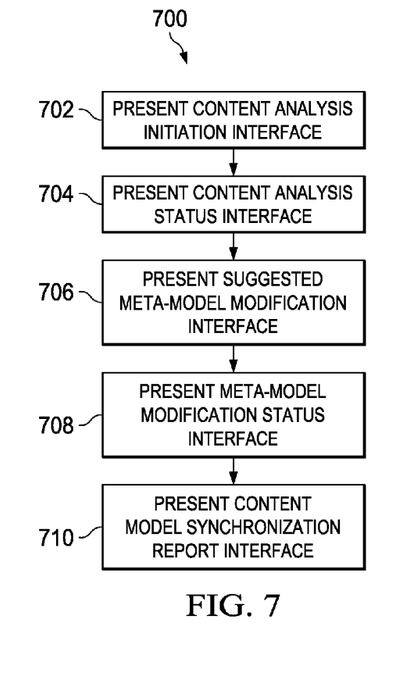
FIG. 7 is a flow chart of a user interface generation process flow.

Turning now to FIG. 7, FIG. 7 is a flow chart of a user interface generation process flow. For clarity of presentation, the description that follows generally describes method 700 in the context of FIG. 1. However, it will be understood that method 700 may be performed, for example, by any other suitable system, environment, software, and hardware, or a combination of systems, environments, software, and hardware as appropriate. For example, one or more of the enterprise portal server, the client, or other computing device (not illustrated) can be used to execute method 700 and obtain any data from the memory of the client, the enterprise portal server, or the other computing device (not illustrated).

At 702, a content analysis initiation interface is presented to user by the meta-model synchronization tool. In other implementations, the content analysis initiation interface can be generated by another component of the example distributed computing system. In some implementations, the content analysis initiation interface may be a component (e.g., a button, menu item, etc.) of an existing GUI. In other implementations, the content analysis initiation interface may be a stand-alone GUI. Initiation of a content analysis, i.e., a request, using the content analysis initiation interface may be performed by clicking/selecting with a computer mouse or equivalent device, voice recognition, touch input using a touch interface, or other suitable method and/or device to indicate a content analysis should be initiated. Once a content analysis request is received, the meta-model synchronization tool sends a message to the content analyzer to start the content analysis and initiates a display of a content analysis status interface. From 702, method 700 proceeds to 704.

At 704, the meta-model synchronization tool displays the content analysis status interface. In other implementations, the content analyzer displays the content analysis status interface. In some implementations, the content analyzer returns status information to the meta-model synchronization tool with which to update the content analysis status interface. In other implementations, the content analyzer directly updates the content analysis status interface. In some implementations, once the content analysis is complete, the meta-model synchronization tool removes the content analysis status interface and initiates a display of the suggested meta-model modification interface. In other implementations, once the content analysis is complete, the content analyzer removes the content analysis status interface and initiates a display of the suggested meta-model modification interface. From 704, method 700 proceeds to 706.

At 706, the meta-model synchronization tool displays the suggested meta-model modification interface. In other implementations, the content analyzer displays the suggested meta-model modification interface. In some implementations, once the application of selected modifications is requested, for example by selecting the "Apply Selected Modifications" button shown in FIG. 5, the meta-model synchronization tool removes the content analysis status interface, initiates an update of the meta-model using the meta-model synchronizer service, and initiates a display of a meta-model modification status interface similar to the content analysis status interface shown in FIG. 4. In other implementations, the content analyzer removes the content analysis status interface, initiates an update of the meta-model using the meta-model synchronizer service, and initiates a display of the meta-model modification status interface.

At 708, the meta-model synchronization tool displays the meta-model modification status interface. In other implementations, the meta-model synchronizer service displays the meta-model modification status interface. In some implementations, the meta-model synchronizer service returns status information to the meta-model synchronization tool with which to update the meta-model modification status interface. In other implementations, the meta-model synchronizer service directly updates the meta-model modification status interface. In some implementations, once the meta-model modification is complete, the meta-model synchronization tool removes the meta-model modification status interface and initiates a display of the synchronization report interface. In other implementations, once the meta-model modification is complete, the meta-model synchronizer service removes the meta-model modification status interface and initiates a display of the synchronization report interface. From 708, method 700 proceeds to 710.

At 710, the meta-model synchronization tool displays the synchronization report interface. In other implementations, the meta-model synchronization service displays the synchronization report interface. From 710, method 700 stops.

Figure 8:
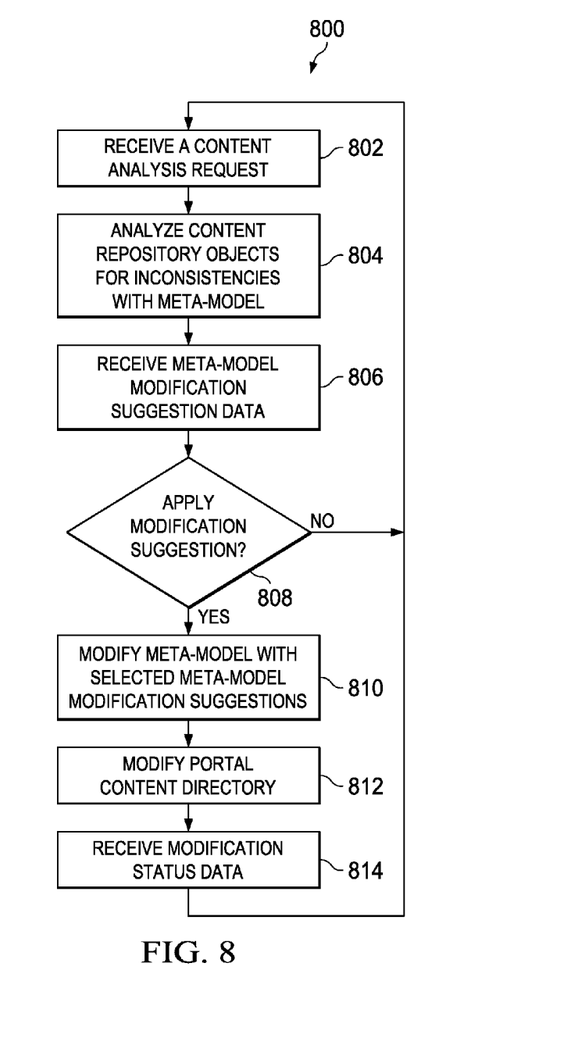
FIG. 8 is a flowchart of an example method for updating enterprise portal content meta-models.

Turning now to FIG. 8, FIG. 8 is a flowchart of an example method for updating enterprise portal content meta-models. For clarity of presentation, the description that follows generally describes method 800 in the context of FIG. 1. However, it will be understood that method 800 may be performed, for example, by any other suitable system, environment, software, and hardware, or a combination of systems, environments, software, and hardware as appropriate. For example, one or more of the enterprise portal server, the client, or other computing device (not illustrated) can be used to execute method 800 and obtain any data from the memory of the client, the enterprise portal server, or the other computing device (not illustrated).

At 502, a content analysis request is received by the meta-model synchronization tool. For the purposes of this example, the meta-model synchronization tool will act as a coordinator of the requested content analysis. In other implementations, the requested content analysis can be coordinated by one or more hardware/software component(s) of example distributed computing system 100. The meta-model synchronization tool displays the content analysis status interface and requests that the content analyzer perform an analysis of the content repository. From 802, method 800 proceeds to 804.

At 804, the content analyzer analyzes content repository objects for inconsistencies with the meta-model. The content analyzer passes status information to the meta-model synchronization tool with which to update the content analysis status interface. From 804, method 800 proceeds to 806.

At 806, the meta-model synchronization tool receives meta-model modification suggestion data from the content analyzer. The meta-model synchronization tool displays the suggested meta-model suggestion interface. From 806, method 800 proceeds to 808.

At 808, a determination is made whether a modification suggestion was selected to be applied to the meta-model. If at 808, it is determined that a modification suggestion was not selected to be applied to the meta-model, method 800 proceeds to 802. If at 808, however, it is determined that a modification suggestion was selected to be applied to the meta-model, method 800 proceeds to 810.

At 810, the meta-model synchronization tool displays a meta-model synchronization status interface and initiates a modification of the meta-model using the meta-model synchronization service and passing meta-model modification suggestion data corresponding to selected meta-model modification suggestions in the suggested meta-model suggestion interface. The meta-model synchronization tool also updates the meta-model synchronization status interface. From 810, method 800 proceeds to 812.

At 812, the meta-model synchronization service also modifies the PCD consistent with the modifications made to the meta-model. Once complete with updates to the PCD, the meta-model synchronization tool removes the meta-model synchronization status interface. From 812, method 800 proceeds to 814.

At 814, the meta-model synchronization tool receives update status data from the meta-model synchronization service. The meta-model synchronization tool displays the content model synchronization status report interface displaying the status of updates to the meta-model. In some implementations, status updates to the PCD are also displayed in the content model synchronization status report interface. From 814, method 800 proceeds to 802.

In some implementations, suggested modifications in the suggested meta-model suggestion interface that are unchecked are not applied during the update of the meta-model and may not shown in the content model synchronization status report interface. During the next content analysis, they may be displayed in the suggested meta-model suggestion interface under a category, for example "Previously Skipped." This can provide a repeated opportunity for the prior suggested modifications to be applied to the meta-model. In some implementations, ignored suggested modifications may be cleared from presented interfaces, electronically transferred using email and/or other suitable electronic transfer method, and/or saved to a file and/or other data structure.

In some implementations, the subject matter of this disclosure may be applied to collaborative pages, workspaces, and other suitable environments.

The preceding figures and accompanying description illustrate example processes and computer implementable techniques. But example distributed computing system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example distributed computing system 100 may use processes with additional steps, fewer steps, and/or different steps, so long as the methods remain appropriate. Process steps may also be executed and described software/services may also execute on various components of example distributed computing system 100 so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method, comprising:
   receiving a content analysis request associated with a content repository;
   analyzing, using at least one computer, a modified content repository object for inconsistencies with a meta-model containing a description of an unmodified content repository object that corresponds to the modified content repository object;
   receiving meta-model modification suggestion data;
   modifying the meta-model using the meta-model modification suggestion data; and
   receiving modification status data.

2. The method of claim 1, wherein the analysis of the modified content repository object is performed by a content analyzer.

3. The method of claim 1, wherein the meta-model modification suggestion data comprises model modification objects.

4. The method of claim 3, wherein a particular model modification object of the model modification objects represents at least one suggested modification to the meta-model to rectify an identified inconsistency between the modified content repository object and the meta-model.

5. The method of claim 1, further comprising determining that a meta-model modification is to be performed.

6. The method of claim 1, wherein the determination is made based upon input received by a graphical user interface, wherein meta-model modification selections are selected.

7. The method of claim 1, wherein the modification of the meta-model is performed by a meta-model synchronization service.

8. The method of claim 1, further comprising modifying a portal content directory consistent with the modifications made to the meta-model.

9. A computer-program product, the computer program product comprising computer-readable instructions embodied on tangible, non-transitory media, the instructions operable when executed to perform operations to:
receive a content analysis request associated with a content repository;
analyze a modified content repository object for inconsistencies with a meta-model containing a description of an unmodified content repository object that corresponds to the modified content repository object;
receive meta-model modification suggestion data;
modify the meta-model using the meta-model modification suggestion data; and
receive modification status data.

10. The computer-program product of claim 9, wherein the analysis of the modified content repository object is performed by a content analyzer.

11. The computer-program product of claim 9, wherein the meta-model modification suggestion data comprises model modification objects.

12. The computer-program product of claim 11, wherein a particular model modification object of the model modification objects represents at least one suggested modification to the meta-model to rectify an identified inconsistency between the modified content repository object and the meta-model.

13. The computer-program product of claim 9, further comprising instructions operable when executed to perform operations to determine that a meta-model modification is to be performed.

14. The computer-program product of claim 9, wherein the determination is made based upon input received by a graphical user interface, wherein meta-model modification selections are selected.

15. The computer-program product of claim 9, wherein the modification of the meta-model is performed by a meta-model synchronization service.

16. The computer-program product of claim 9, further comprising instructions operable when executed to perform operations to modify a portal content directory consistent with the modifications made to the meta-model.

17. A system, comprising:
memory operable to store a meta-model; and
at least one hardware processor interoperably coupled to the memory and operable to:
receive a content analysis request associated with a content repository;
analyze a modified content repository object for inconsistencies with the meta-model containing a description of an unmodified content repository object that corresponds to the modified content repository object;
receive meta-model modification suggestion data;
modify the meta-model using the meta-model modification suggestion data; and
receive modification status data.

18. The system of claim 17, wherein the analysis of the modified content repository object is performed by a content analyzer.

19. The system of claim 17, wherein the meta-model modification suggestion data comprises model modification objects.

20. The system of claim 19, wherein a particular model modification object of the model modification objects represents at least one suggested modification to the meta-model to rectify an identified inconsistency between the modified content repository object and the meta-model.

21. The system of claim 17, further operable to determine that a meta-model modification is to be performed.

22. The system of claim 17, wherein the determination is made based upon input received by a graphical user interface, wherein meta-model modification selections are selected.

23. The system of claim 17, wherein the modification of the meta-model is performed by a meta-model synchronization service.

24. The system of claim 17, further operable to modify a portal content directory consistent with the modifications made to the meta-model.

* * * * *